April 20, 1926.

F. A. PARK

GRAPE PACKING DEVICE

Filed Sept. 8, 1925

1,581,470

Inventor

Floyd A. Park,

Attorneys

Patented Apr. 20, 1926.

1,581,470

UNITED STATES PATENT OFFICE.

FLOYD A. PARK, OF DINUBA, CALIFORNIA.

GRAPE-PACKING DEVICE.

Application filed September 8, 1925. Serial No. 54,992.

*To all whom it may concern:*

Be it known that I, FLOYD A. PARK, a citizen of the United States, residing at Dinuba, in the county of Tulare and State of California, have invented certain new and useful Improvements in Grape-Packing Devices, of which the following is a specification, reference being had therein to the accompanying drawings.

This invention relates to a method of and means for packing grapes and other like easily injured products.

It is the custom in the trade to pack grapes in drums filled with the grapes and saw dust, ground cork, or other granular material. It is of importance, if the grapes are to remain in the best condition, that the berries of the grapes do not come in direct contact with the sides of the drum in which they are packed.

Packing house employees become careless and in their haste pack the grapes in such manner that, in many instances, they are injured in transit. Or if the packing house employees use the necessary care to prevent the grapes from coming in contact with the walls of the drum in which they are packed, considerable additional time is consumed and this, in turn, increases the cost of packing.

By virtue of the construction and method constituting the subject matter of the present invention, the grapes may be packed with great facility and without the necessity of exercising any considerable amount of care and, at the same time, the possibility of the grapes coming in contact with the sides of the drum or from coming in contact with each other to an objectionable degree at the center of the drum will be avoided.

In the accompanying drawings, in which like figures designate corresponding parts in both of the views—

Figure 1:
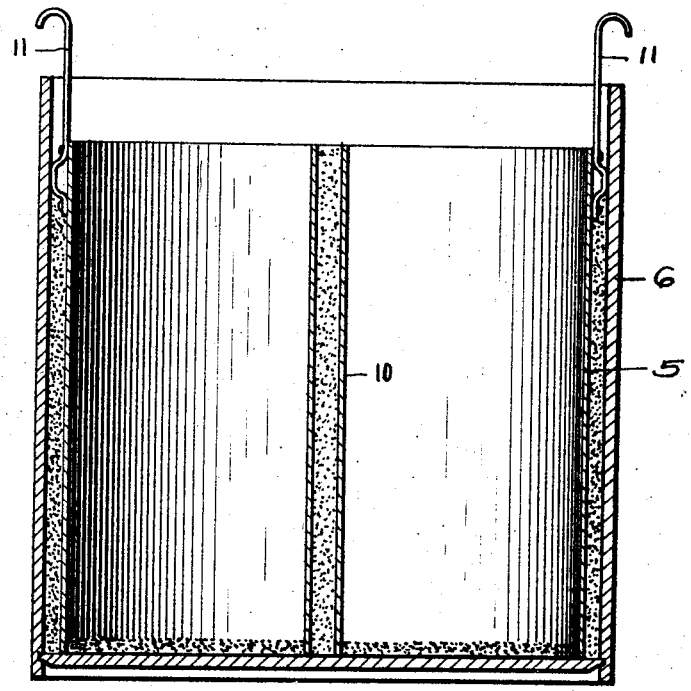
Figure 2:
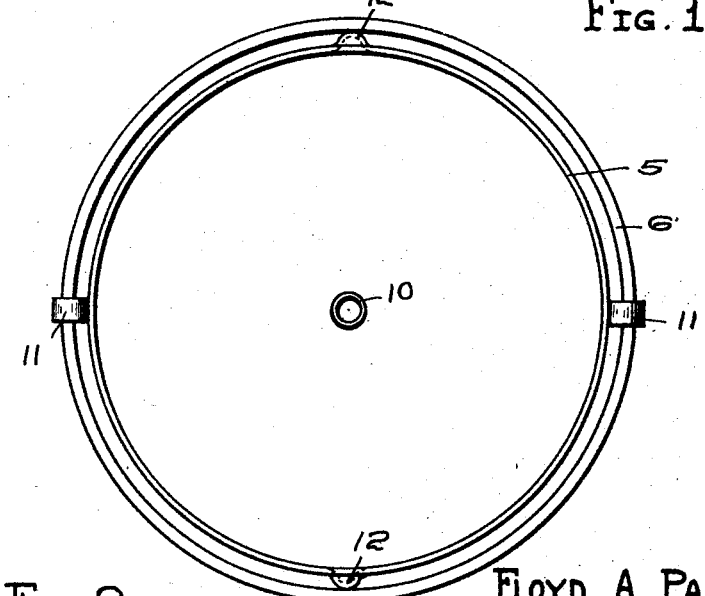

Figure 1 is a vertical sectional view of the means employed by me in carrying out the invention, and Figure 2 is a plan view of the same.

According to the present invention, I employ a hollow drum 5, preferably somewhat shorter than the packing drum 6 and also enough smaller in diameter than the packing drum, that when the false drum, which has an open bottom, is placed within the packing drum, a space of from one-half to three-quarters of an inch will be left between the confronting walls of said drums. This space is filled with the saw dust or other granular material in which the grapes are to be packed, by a sweep from the scoop of the packer. The fact that the packing drum is taller than and projects above the false drum renders it possible for the packer to throw the saw dust with a quick movement against that portion of the packing drum which projects above the false drum, said saw dust falling into the space between the drums. The saw dust that is spilled is utilized as a floor covering for the packing drum.

I further employ a false core 10 which is of tubular formation and is placed at the center of the drum and filled with saw dust. The grapes and the saw dust in which they are to be packed are then filled in rapidly between the false drum and the core and after the packing has been completed, the false drum and the core are withdrawn, leaving the grapes properly packed with a core of saw dust at the center and with a layer of saw dust which contains no grapes, adjacent the walls of the packing drum.

To facilitate the withdrawal of the false drum from the main drum, handles 11 are provided and project enough above the top of the false drum to permit of their being readily grasped. If desired, these handles may be made of such shape and size as to just touch the inner walls of the packing drum so that they will act as spacing elements and aid in centering the false drum in the packing drum. Furthermore, I may, if I desire to do so, place additional spacing lugs 12 at the points shown, to act in conjunction with said handles for centering the false drum within the packing drum.

It is to be understood that the invention is not limited to the precise construction set forth but that it includes within its purview whatever changes fairly come within either the terms or the spirit of the appended claims.

Having described my invention, what I claim is:

1. The herein described method of packing which consists of inserting a false drum within a drum to be packed, filling the space between the two drums with granular material, packing the space within the false drum with granular material and the articles to be packed and then withdrawing the false drum.

2. The herein described method of packing which consists of inserting within a drum to be packed, a false drum of such diameter with respect to the packing drum as to leave a space between the two, filling said space with granular material inserting within the false drum at the center thereof, a tubular core, filling said core with granular material, packing the space within the false drum with granular material and the articles to be packed and then withdrawing both the core and the false drum.

3. In combination a drum to be packed, a false drum having an open bottom and slightly smaller in diameter than the packing drum, and a tubular open bottom core.

In testimony whereof I hereunto affix my signature.

FLOYD A. PARK.